United States Patent
Richters et al.

(10) Patent No.: US 6,193,916 B1
(45) Date of Patent: Feb. 27, 2001

(54) METHOD FOR MANUFACTURING A PLASTIC BOARD

(75) Inventors: Franciscus Egbertus Richters, Oldenzaal; Johannes Düring, Losser; Andreas Bernardus Eidhof, Enschede; Christiaan Antonius Jagers, Hengelo, all of (NL)

(73) Assignee: Corell Resin Technology B.V. (NL)

( * ) Notice: Subject to any disclaimer, the term of this patent is extended or adjusted under 35 U.S.C. 154(b) by 0 days.

(21) Appl. No.: 09/059,971

(22) Filed: Apr. 14, 1998

Related U.S. Application Data

(63) Continuation of application No. 08/494,137, filed on Jun. 23, 1995, now abandoned.

(30) Foreign Application Priority Data

Jun. 24, 1994 (NL) .................................................. 9401055
Aug. 29, 1994 (NL) .................................................. 9401392

(51) Int. Cl.⁷ .................................................. B29C 44/06
(52) U.S. Cl. .................. 264/46.6; 264/46.4; 264/46.8; 264/259; 264/267; 264/275; 264/511
(58) Field of Search ................... 264/51, 328.7, 264/46.4, 46.5, 46.6, 46.8, 259, 267, 275, 511

(56) References Cited

U.S. PATENT DOCUMENTS

| | | | |
|---|---|---|---|
| 3,712,771 | * 1/1973 | White et al. | 264/46.8 |
| 4,031,176 | 6/1977 | Molbert | 264/328.7 |
| 4,096,218 | 6/1978 | Yasuike et al. | 264/45.5 |

(List continued on next page.)

FOREIGN PATENT DOCUMENTS

| | | |
|---|---|---|
| 2416597 | 10/1975 | (DE) . |
| 4100538 | 5/1992 | (DE) . |
| 4122412 | 1/1993 | (DE) . |
| 4127241 | 2/1993 | (DE) . |
| 0033116 | 8/1981 | (EP) . |
| 0480456 | 4/1992 | (EP) . |
| 0481306 | 4/1992 | (EP) . |
| 0502606 | 9/1992 | (EP) . |
| 1044511 | 10/1966 | (GB) . |
| 2259884 | 3/1993 | (GB) . |
| WO/ 8401352 | 4/1984 | (WO) . |
| WO /8900918 | 2/1989 | (WO) . |

OTHER PUBLICATIONS

Eckardt, Helmut, "Schaumspritzgiessverfahren—Theorie und Praxis", Kunststoffberater, vol. 28, 1983, pp. 26–32.

(List continued on next page.)

*Primary Examiner*—Allan R. Kuhns
(74) *Attorney, Agent, or Firm*—Webb Ziesenheim Logsdon Orkin & Hanson, P.C.

(57) ABSTRACT

A method for manufacturing a plastic board comprising a sandwich-like structure comprises the steps of:

(1) providing an injection moulding device with a mould which comprises at least two mould parts displaceable relative to each other by displacing means, which mould parts in a closed first extreme position bound a mould cavity connecting onto an injection unit and in an open second extreme position release a formed board for removal;

(2) providing foaming means for causing foaming in the mould cavity of plastic injected into the mould cavity;

(3) providing blocking means for temporarily rendering the foaming means inactive;

(4) energizing the blocking means;

(5) energizing the injection unit in the first extreme position of the mould;

(6) ending the energizing of the blocking means;

(7) ending the energizing of the injection unit; and (8) displacing the mould parts relative to each other.

10 Claims, 4 Drawing Sheets

U.S. PATENT DOCUMENTS

| | | | |
|---|---|---|---|
| 4,133,858 | | 1/1979 | Hayakawa et al. ................. 264/54 |
| 4,208,368 | | 6/1980 | Egli ................................ 264/40.3 |
| 4,479,914 | | 10/1984 | Baumrucker ..................... 264/40.3 |
| 4,525,408 | * | 6/1985 | Johansson ........................ 264/46.6 |
| 4,867,672 | | 9/1989 | Sorensen ......................... 264/328.7 |
| 5,049,344 | | 9/1991 | Sorensen ......................... 264/328.7 |
| 5,063,008 | | 11/1991 | Wenskus, Jr. et al. ........... 264/328.7 |
| 5,093,053 | | 3/1992 | Eckardt et al. ................... 264/510 |
| 5,116,557 | * | 5/1992 | Debaes et al. .................... 264/46.6 |
| 5,281,376 | * | 1/1994 | Hara et al. ....................... 264/328.7 |
| 5,324,462 | * | 6/1994 | Rohn ................................ 264/46.4 |
| 5,437,823 | | 8/1995 | Hettinga et al. .................. 264/45.5 |
| 5,501,829 | * | 3/1996 | Nichols ............................ 264/261 |
| 5,972,278 | * | 10/1999 | Ito et al. .......................... 264/259 |

OTHER PUBLICATIONS

Brouwer, R. R. "Technisch struktuurschuim", Kunststof en Rubber, No. 5, 1984, pp. 14–19.

Absract of Japanese Patent No. 61–35216, vol. 10, No. 191, Jul. 4, 1986, 1 page.

Abstract of Japanese Patent No, 63–216717, vol. 13, No. 6, Jan. 9, 1989, 1 page.

Abstract of Japanese Publication No. JP4219220, vol. 16, No. 563, Dec. 4, 1992, 1 page.

Abstract of Japanese Publication No. JP5057744, vol. 017365, Jul. 9, 1993, 1 page.

* cited by examiner

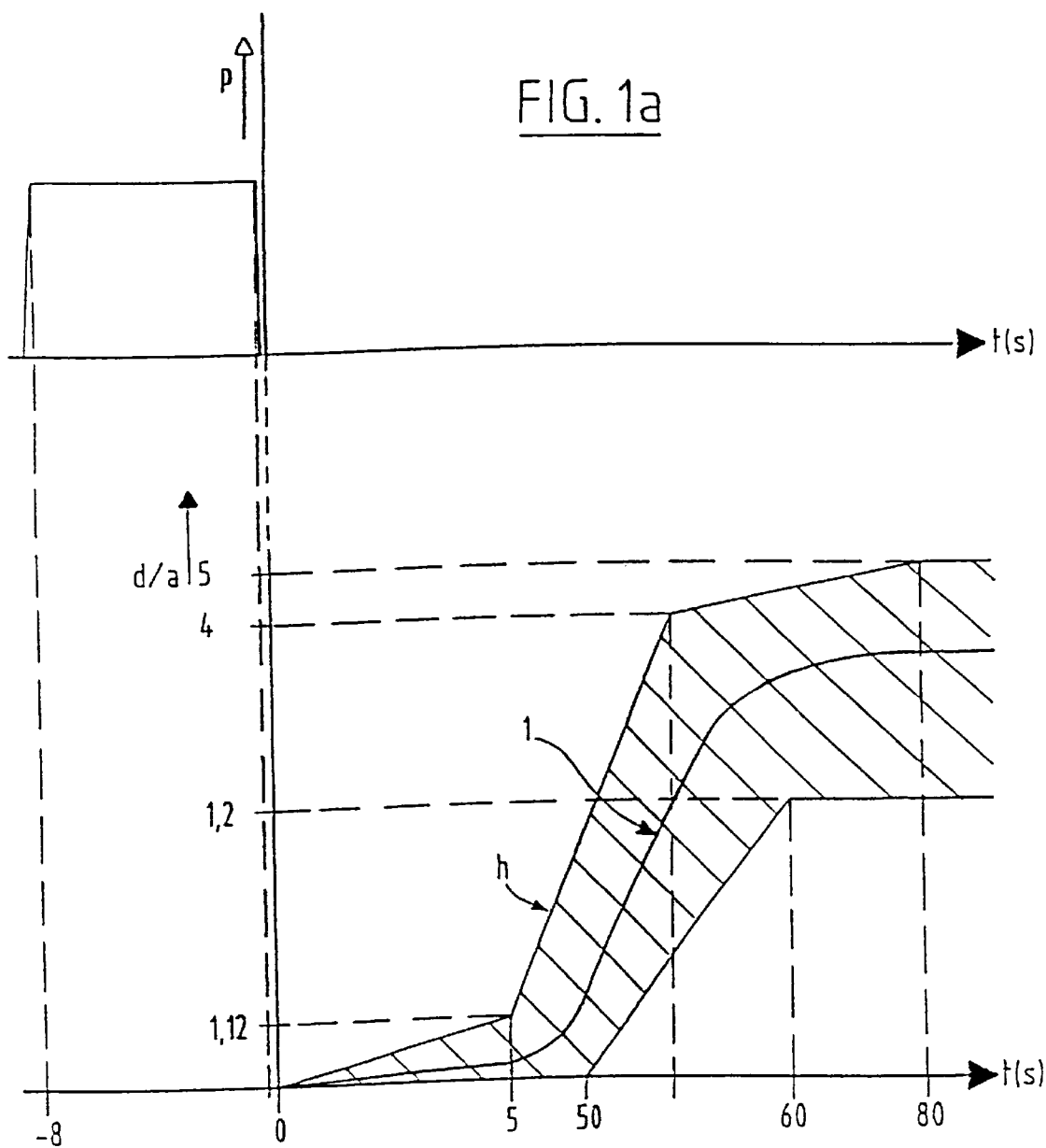

METHOD FOR MANUFACTURING A PLASTIC BOARD

This is a continuation of U.S. patent application Ser. No. 08/494,137, filed Jun. 23, 1995, now abandoned.

BACKGROUND OF THE INVENTION

1. Field of the Invention

The invention relates to a method for manufacturing a monolithic plastic board with a thickness of at least 6 mm, preferably (20±10) mm, which board is constructed as structural foam and comprises a sandwich-like structure with a foam core and closed skin plates.

2. Description of the Prior Art

Such a method and board obtained therewith is known for instance from U.S. Pat. No. 4,096,218.

Known from this American patent specification is a method according to which a few seconds after completion of injection of the plastic the mould cavity is enlarged in a predetermined time and in controlled manner. By making use of a foaming agent and application of gas counter pressure can thus be achieved that the foam structure is of good quality, while the skin of the obtained board has a closed and smooth structure.

According to the said American patent the mould is held for a predetermined time in its closed starting position, whereafter the mould undergoes a determined expansion in a subsequent specified period. After reaching maximum expansion cooling takes place for a time, whereafter the formed board can be removed.

Attention is also drawn to U.S. Pat. No. 4,133,858, which deals with a related technique and wherein mention is also made of a number of possible plastics for use in the context of this technique and substances such as foaming agents for adding thereto.

Since it has been found that with the known method boards of a sufficiently high quality cannot be obtained, it is an object of the invention to provide a method with which a board of improved quality can be manufactured.

A further object of the invention is to perform the known method such that it lends itself to prior placing in the mould of a decorative foil such that this foil is positioned on an outer surface of the obtained board.

Yet another object of the invention is to perform the method such that the obtained board has an optimum flatness within very narrow tolerances or, more generally, has a form which within very narrow tolerances is the same as the desired nominal form.

Yet a further object of the invention is to perform the method such that less expensive plastics, for instance plastics of recycled quality, are also usable to obtain a board with the desired superior properties.

SUMMARY OF THE INVENTION

In order to realize the above stated objectives the invention provides a method for manufacturing a monolithic plastic board with a thickness of at least 6 mm, preferably (20±10) mm, which board comprises a sandwich-like structure with a foam core and closed skin plates, which method comprises the following steps to be performed in suitable sequence of:

(1) providing an injection moulding device with a plastic-plasticizing and injection device and a mould which comprises at least two mould parts displaceable relative to each other by displacing means, which mould parts in a closed first extreme position bound a mould cavity connecting onto the plasticizing and injection unit and in an open second extreme position release a formed board for removal, which displacing means are adapted to move the mould parts at a chosen speed;

(2) providing foaming means for causing foaming in the mould cavity of plastic injected into the mould cavity;

(3) providing blocking means for temporarily rendering the foaming means inactive, for instance gas feed means for feeding gas under pressure to the mould cavity;

(4) energizing the blocking means;

(5) energizing the plasticizing and injection unit in the first extreme position of the mould in order to inject heated plastic into the mould cavity;

(6) ending the energizing of the blocking means;

(7) ending the energizing of the plasticizing and injection unit;

(8) energizing the displacing means such that the mould parts displace relative to each other in accordance with the graph below, wherein the hatched area shows the limits of the progress of the ratio of the displacement (d) to the starting thickness (a) in time (t):

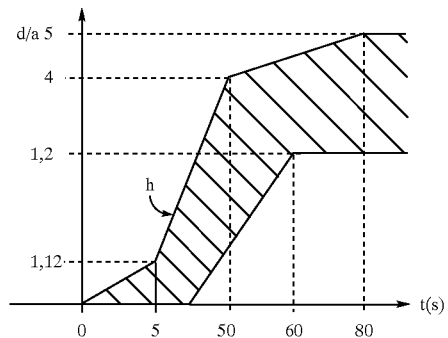

wherein the slope h is in principle not limited; and (9) causing the formed board to cool to a chosen temperature, fully opening the mould cavity and removing the cooled board.

Attention is drawn to the fact that, in contrast to the stated prior art, the invention is not limited to the use of the so-called gas counter pressure with which foaming of the injected plastic in the mould cavity can be temporarily discontinued.

The accompanying claims 2–9 relate to specific embodiments of the method according to the invention. It is noted that the mentioned materials and substances are only summarized by way of example without any limitative significance.

The slope h corresponds with the greatest possible speed which can be realized by the associated injection moulding device. It must therefore be understood that the relevant upper limit is determined only by the injection moulding device used and is not essentially related to the choices made within the scope of the invention.

The invention also relates to a monolithic plastic board manufactured with application of the method according to any of the claims 1–9. Such a board can in particular have a form such that the board has a non-round shape and a bent peripheral edge.

The invention further relates to a method for manufacturing a plastic board on which is arranged a cover foil.

The object of the invention is to provide a method for manufacturing such a board, in addition to the board itself, such that the cover foil is not only situated on the surface thereof but also extends round the peripheral edge of the board such that during normal use, for example as a table top, the peripheral edge of the foil is invisible.

For this purpose the invention provides a method for manufacturing a plastic board provided with a cover foil, which method comprises the following steps to be performed in suitable sequence of:

(1) providing an injection moulding device with a plastic-plasticizing and injection device and a mould which comprises at least two mould parts displaceable relative to each other, which mould parts in a closed first extreme position bound a mould cavity which connects onto the plasticizing and injection unit and which has a shape adapted to the shape of the board for manufacturing, and which mould parts in an open second extreme position release a formed board for removal;

(2) manufacturing a cover foil preform with an undercut peripheral edge shape which is adapted to the shape of the board for manufacturing such that the cover foil can extend round the peripheral edge of the board for manufacturing;

(3) placing the preform against the wall of the opened mould cavity remote from the plastic feed opening connected to the plastic-plasticizing and injection device and holding said preform in position therein by means of holding means;

(4) closing the mould cavity and energizing the plasticizing and injection unit to inject into the mould cavity plasticized plastic which can adhere with the preform;

(5) ending the energizing of the plasticizing and injection unit;

(6) moving the mould parts in the direction of the second extreme position; and (7) causing the formed board with cover foil adhered thereto to cool to a chosen temperature, fully opening the mould cavity and removing the manufactured board.

In preference a method is applied which comprises performing step (4) with polypropylene (PP) as the plastic for injecting. A superior board can be obtained with such a method, while polyvinylchloride (PVC) is avoided as plastic.

In a further embodiment of the latter specified method, the method comprises the steps of (9) performing step (8) and

(10) performing step (4) such that the manufactured board has a thickness of at least 6 mm, preferably (20±10) mm, which board comprises a sandwich-like structure with a foam core and closed skin plates.

This latter method can preferably be performed by making use of the step of

(11) performing step (10) by making use of the specifications according to the non-prepublished Netherlands patent application NL-94 01055. A qualitatively superior board can hereby be obtained with a very smooth and flat surface, a great stiffness and a very low average density.

The method according to the invention can advantageously be performed by applying the step of

(12) performing step (2) by manufacturing from plastic foil a generally omega-shaped basic preform, by for instance making use of a diaphragm press, a vacuum deep-draw device or other suitable means, and subsequently removing an end zone thereof, for instance by cutting, in order to obtain the desired undercut form of the cover foil preform.

In a specific embodiment use is made of the step of

(13) performing step (4) with compatible or the same plastics for the foil and the plastic for injecting.

Use can alternatively be made of the step of

(14) performing step (4) by making use of a foil with an adhesive layer present thereon and to be directed toward the mould cavity, for example a heat-activated plastic layer such as polyethylene (PE).

The cover foil preform does not necessarily have to fit precisely into the mould cavity. During injection of the heated, plasticized plastic into the mould cavity the preform can undergo softening and associated change of shape. In this respect the method according to the invention can take place with application of the step of

(15) performing step (2) such that during the plastic injection the preform undergoes an expansion in its edge zone, for instance such that the undercut is, enlarged.

It is important that the preform is held in position in the mould cavity. This is essential in the case where the associated end wall of the opened mould cavity extends for instance in a vertical plane. In this respect use can be made of the step of

(16) performing step (3) with suction means, electrostatic means and/or mechanical means as holding means.

In order to be able to guarantee the desired dimensioning of the end product with a good level of accuracy, use is preferably made of the step of

(17) dimensioning the mould cavity as according to step (1) taking into account the cooling shrinkage of the injected plastic. This cooling shrinkage can amount for instance to an order of magnitude of 1.6%.

Less critical, but nevertheless practical, is the embodiment which makes use of the step of

(18) performing step (2) by making use of a mould surface forming part of a mould, taking into account the cooling shrinkage of the applied foil material. This cooling shrinkage can lie in the order of magnitude of 1.3%.

The invention further relates to a plastic board onto which a plastic cover foil is arranged, which board is manufactured by applying the method as according to any of the claims 9–10, which cover foil extends over a surface of a board and round the peripheral edge thereof.

BRIEF DESCRIPTION OF THE DRAWINGS

FIG. 1a illustrates injection pressure of plastic as a function of time;

FIG. 1b illustrates limits within which two mould parts can move relative to each other;

DESCRIPTION OF THE PREFERRED EMBODIMENTS

The invention will now be elucidated with reference to the annexed drawings.

In FIG. 1a the injection pressure with which the plastic is injected into the mould cavity is plotted as a function of time.

FIG. 1b shows with the same reference t=0 the limits within which, in accordance with the teaching of the invention, the two mould parts which together bound the mould cavity can move relative to each other.

It will be apparent that FIG. 1a relates to a wholly random example. Injection begins about 8 seconds before expanding of the mould cavity. After a time the final injection pressure is reached as according to a curve which is not relevant per se. Once injection is completed and after a short delay, expanding of the mould cavity begins to take place as according to FIG. 1b. The limits of the hatched area are those which are stated in claim 1. Drawn by way of example in the hatched area is a practical curve 1 corresponding with a practical embodiment. It can be seen clearly that according to the teaching of the invention use is initially made of a very slow expansion, followed by a rapid expansion, which then slows down again until the final volume of the mould cavity is reached.

Attention is drawn to the fact that the shape of the injection pressure curve can also be varied as necessary and as desired. The injection moreover does not have to be ended before the point in time t=0.

Figure 2A:
FIG. 2a–FIG. 2c illustrate variations of the graphs illustrated in FIGS. 1a and 1b.
Figure 2B:
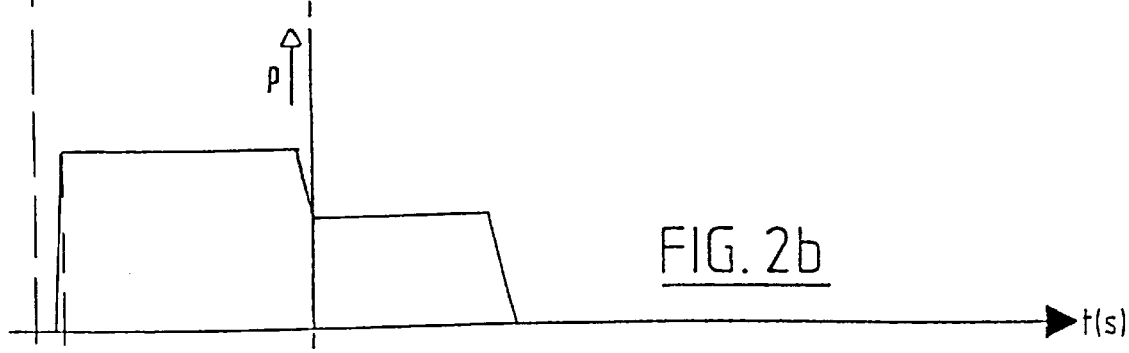

FIG. 2a shows that, shortly before the point in time t=−9, gas, for example nitrogen, is admitted under pressure into the mould cavity. Subsequently, in this case at the point in time t=−8, the injection of plastic begins. Around the point in time t=0 the gas counter pressure is reduced, as indicated in FIG. 2a, while an after-pressure is still exerted by the injection unit as shown in FIG. 2b. At a point in time t=0 expanding of the mould cavity meanwhile begins as according to FIG. 1b.

Figure 2C:
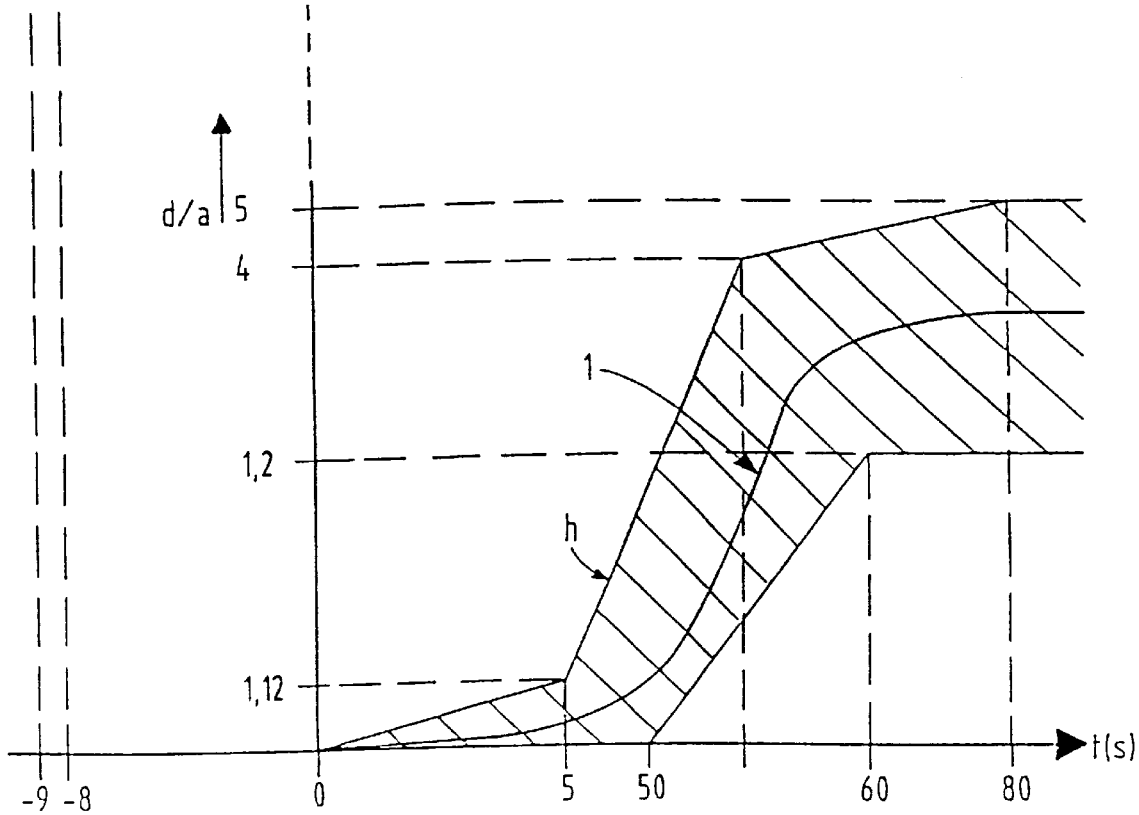

Emphatic note is once again made of the fact that FIGS. 1a, 2a and 2b have only an indicative significance. any variants of the shapes of the curves, the values of the diverse parameters and the like are possible without the scope of the invention being thereby exceeded. The final shape of the curve 1 in FIGS. 1b and 2c can also be chosen as desired within the hatched area. The parameter combinations will generally have to be determined such that the best result is obtained with a given plastic, optionally with additives.

A board according to the invention comprises two solid plates which bound a foam core. The board is integral and between each skin plate and the foam core is located an area with a smooth change of density.

The board displays a very favourable ratio of mechanical strength and stiffness on the one hand and weight on the other.

Very favourable properties in respect of thermal and acoustic insulation can be obtained with a board having an enlarged thickness, particularly of the foam core. The choices for the optimum combination depend on the requirements made of the board in question.

A board according to the invention can also be characterized by the relative density, that is, the effective average density of the board divided by the density of the plastic itself. According to the invention values of considerably lower than 0.75 can be achieved. At the moment a value of 0.25 can be realized.

The tables I–V following hereinafter relate to experiments within the context of the invention.

TABLE I

| no. ( ) | 45 | 49 | 56 | 80 | 82 | 83 | 84 |
|---|---|---|---|---|---|---|---|
| material type ( ) | 40K35mlgd | 40K35mlgd | 40K35mlgd | 2k-mlgd | 2k-mlgd | 2k-mlgd | 2k-mlgd |
| driving agent type ( ) | BIH-70 | BIH-70 | BIH-70 | BIH-70 | BIH-70 | BIH-70 | BIH-70 |
| dosage (wt %) | 2 | 2 | 2 | 2 | 3 | 3 | 3 |
| melt temperature (° C.) | 240 | 240 | 240 | 240 | 240 | 240 | 240 |
| dosing displacement (mm) | 340 | 340 | 340 | 340 | 340 | 340 | 340 |
| mould pressure (bar) | 30 | 30 | 30 | 30 | 30 | 30 | 30 |
| injection time (sec) | 8 | 8 | 8 | 8 | 19 | 6 | 8 |
| injection profile | | | | | | | |
| 1 (%) | 15 | 15 | 15 | 15 | 20 | 60 | 50 |
| 2 (%) | 20 | 20 | 20 | 20 | 20 | 60 | 50 |
| 3 (%) | 50 | 50 | 50 | 50 | 20 | 60 | 50 |
| 4 (%) | 50 | 50 | 50 | 50 | 20 | 60 | 50 |
| 5 (%) | 50 | 50 | 50 | 50 | 20 | 66 | 50 |
| 6 (%) | 50 | 50 | 50 | 50 | 20 | 60 | 50 |
| 7 (%) | 50 | 50 | 50 | 50 | 20 | 60 | 50 |
| 8 (%) | 50 | 50 | 40 | 40 | 20 | 60 | 50 |
| 9 (%) | 50 | 50 | 30 | 30 | 20 | 60 | 50 |
| 10 (%) | 20 | 20 | 15 | 15 | 20 | 60 | 50 |
| after-pressure (bar) | 20 | 20 | 20 | 20 | 20 | 20 | 20 |
| after-pressure position (mm) | 40 | 40 | 40 | 40 | 40 | 40 | 40 |
| after-pressure time (sec) | 5 | 15 | 0 | 1 | 0 | 0 | 0 |
| gas counter-pressure (bar) | 9 | 9 | 9 | 9 | 9 | 9 | 9 |
| position gas counter-pressure switched off (mm) | 160 | 160 | 85 | 85 | 85 | 85 | 85 |
| delayed mould opening (sec) | 15 | 5 | 15 | 10 | 10 | 10 | 0 |
| initial wall thickness (mm) | 11 | 11 | 11 | 11 | 11 | 11 | 11 |
| end thickness (mm) | 16.5 | 16.5 | 19 | 18.9 | — | 19.5 | 24.1 |
| weight (kg) | 8.31 | 8.63 | — | — | — | — | — |

TABLE II

| no. ( ) | 91 | 92 | 93 | 94 |
|---|---|---|---|---|
| material type ( ) | 2k-mlgd | 2k-mlgd | 2k-mlgd | 2k-mlgd |
| driving agent type ( ) | BIH-70 | BIH-70 | BIH-70 | BIH-70 |
| dosage (wt %) | 2 | 2 | 2 | 2 |
| melt temperature (° C.) | 260 | 260 | 260 | 260 |
| dosing displacement (mm) | 340 | 340 | 340 | 340 |
| mould pressure (bar) | 30 | 30 | 30 | 30 |
| injection time (sec) | 8 | 8 | 8 | 8 |
| injection profile | | | | |
| 1 (%) | 15 | 15 | 15 | 15 |
| 2 (%) | 20 | 20 | 20 | 20 |
| 3 (%) | 50 | 50 | 50 | 50 |
| 4 (%) | 50 | 50 | 50 | 50 |
| 5 (%) | 50 | 50 | 50 | 50 |
| 6 (%) | 50 | 50 | 50 | 50 |
| 7 (%) | 50 | 50 | 50 | 50 |
| 8 (%) | 40 | 40 | 40 | 40 |
| 9 (%) | 30 | 30 | 30 | 30 |
| 10 (%) | 15 | 15 | 15 | 15 |
| after-pressure (bar) | 20 | 20 | 20 | 20 |
| after-pressure position (mm) | 40 | 40 | 40 | 40 |
| after-pressure time (sec) | 0 | 0 | 0 | 0 |
| gas counter-pressure (bar) | 9 | 9 | 9 | 9 |
| position gas counter-pressure switched off (mm) | 85 | 85 | 85 | 85 |
| delayed mould opening (sec) | 10 | 10 | 10 | 10 |
| initial wall thickness (mm) | 11 | 11 | 11 | 11 |
| end thickness (mm) | 18.6 | 19.8 | 21.1 | 21.6 |
| weight (kg) | 8.43 | — | — | — |

TABLE III

| no. ( ) | 100 | 101 | 102 | 103 | 110 | 112 |
|---|---|---|---|---|---|---|
| material type ( ) | 2kmlgd/hopol | 2kmlgd/hopol | 2kmlgd/hopol | 2kmlgd/hopol | 2kmlgd/hopol | 2kmlgd/hopol |
| driving agent type ( ) | BIH-70 | BIH-70 | BIH-70 | BIH-70 | BIH-70 | BIH-70 |
| dosage (wt %) | 2 | 2 | 2 | 2 | 3 | 3 |
| melt temperature (° C.) | 245 | 245 | 245 | 245 | 245 | 245 |
| dosing displacement (mm) | 340 | 340 | 340 | 340 | 390 | 390 |
| mould pressure (bar) | 30 | 30 | 30 | 30 | 30 | 30 |
| injection time (sec) | 8 | 8 | 8 | 8 | 9 | 9 |
| injection profile | | | | | | |
| 1 (%) | 15 | 15 | 15 | 15 | 15 | 15 |
| 2 (%) | 20 | 20 | 20 | 20 | 20 | 20 |
| 3 (%) | 50 | 50 | 50 | 50 | 50 | 50 |
| 4 (%) | 50 | 50 | 50 | 50 | 50 | 50 |
| 5 (%) | 50 | 50 | 50 | 50 | 50 | 50 |
| 6 (%) | 50 | 50 | 50 | 50 | 50 | 50 |
| 7 (%) | 50 | 50 | 50 | 50 | 50 | 50 |
| 8 (%) | 40 | 40 | 40 | 40 | 40 | 40 |
| 9 (%) | 30 | 30 | 30 | 30 | 30 | 30 |
| 10 (%) | 15 | 15 | 15 | 15 | 15 | 15 |
| after-pressure (bar) | 20 | 20 | 20 | 20 | 20 | 20 |
| after-pressure position (mm) | 40 | 40 | 40 | 40 | 40 | 40 |
| after-pressure time (sec) | 0 | 0 | 0 | 0 | 0 | 0 |
| gas counter-pressure (bar) | 9 | 9 | 9 | 9 | 9 | 9 |
| position gas counter-pressure switched off (mm) | 85 | 85 | 85 | 85 | 85 | 85 |
| delayed mould opening (sec) | 16 | 10 | 5 | 0 | 15 | 30 |
| initial wall thickness (mm) | 11 | 11 | 11 | 11 | 13 | 13 |
| end thickness (mm) | 20.7 | 21 | 20.5 | 20.2 | 20.6 | 20.9 |
| weight (kg) | 7.46 | — | — | 7.39 | — | 8.77 |

TABLE IV

| no. ( ) | 120 | 121 | 122 | special |
|---|---|---|---|---|
| material type ( ) | 50L20T30/hopol | 50L20T30/hopol | 50L20T30/hopol | 50L20T30/hopol |
| driving agent type ( ) | BIH-70 | BIH-70 | BIH-70 | Exocerol-70 |
| dosage (wt %) | 2 | 2 | 2 | 1 |
| melt temperature (° C.) | 245 | 245 | 245 | 245 |
| dosing displacement (mm) | 390 | 390 | 390 | 390 |
| mould pressure (bar) | 30 | 30 | 30 | 30 |
| injection time (sec) | 9 | 9 | 9 | 9 |
| injection profile | | | | |
| 1 (%) | 15 | 15 | 15 | 15 |
| 2 (%) | 20 | 20 | 20 | 20 |
| 3 (%) | 50 | 50 | 50 | 50 |
| 4 (%) | 50 | 50 | 50 | 50 |
| 5 (%) | 50 | 50 | 50 | 50 |
| 6 (%) | 50 | 50 | 50 | 50 |
| 7 (%) | 50 | 50 | 50 | 50 |
| 8 (%) | 40 | 40 | 40 | 40 |
| 9 (%) | 30 | 30 | 30 | 30 |
| 10 (%) | 15 | 15 | 15 | 15 |
| after-pressure (bar) | 20 | 20 | 20 | 20 |
| after-pressure position (mm) | 40 | 40 | 40 | 40 |
| after-pressure time (sec) | 0 | 0 | 0 | 0 |
| gas counter-pressure (bar) | 9 | 9 | 9 | 9 |
| position gas counter-pressure switched off (mm) | 85 | 85 | 85 | 85 |
| delayed mould opening (sec) | 25 | 30 | 35 | 20 |
| initial wall thickness (mm) | 13 | 13 | 13 | 13 |
| end thickness (mm) | 21.5 | — | — | 30 |
| weight (kg) | — | 9.46 | — | — |

TABLE V

| no. ( ) | | | 1 | 6 | |
|---|---|---|---|---|---|
| material type ( ) | 30H30 | HT40 | HK-40 | HK-40 | BCK-40 |
| driving agent type ( ) | Exoc.-70 | Exoc.-70 | Exoc.-70 | Exoc.-70 | Exoc.-70 |
| dosage (wt %) | 1 | 1 | 1 | 1 | 1 |
| melt temperature (° C.) | 250 | 240 | 240 | 240 | 250 |
| dosing displacement (mm) | 390 | 390 | 390 | 390 | 315 |
| mould pressure (bar) | 30 | 8 | 8 | 8 | 8 |
| injection time (sec) | 9 | 7.5 | 8 | 10 | 8 |
| injection profile | | | | | |
| 1 (%) | 50 | 50 | 15 | 40 | 50 |
| 2 (%) | 50 | 50 | 20 | 40 | 50 |
| 3 (%) | 50 | 50 | 50 | 40 | 50 |
| 4 (%) | 50 | 50 | 50 | 40 | 50 |
| 5 (%) | 50 | 50 | 50 | 40 | 50 |
| 6 (%) | 50 | 50 | 50 | 40 | 50 |
| 7 (%) | 50 | 50 | 50 | 40 | 50 |
| 8 (%) | 50 | 50 | 40 | 40 | 50 |
| 9 (%) | 50 | 50 | 30 | 40 | 50 |
| 10 (%) | 50 | 50 | 15 | 45 | 50 |
| after-pressure (bar) | 30 | 35 | 35 | 35 | 70 |
| after-pressure position (mm) | 20 | 35 | 40 | 40 | 50 |
| after-pressure time (sec) | 20 | 1 | 10 | 1 | 1 |
| gas counter-pressure (bar) | 9 | 8 | 9 | 9 | 8 |
| position gas counter-pressure switched off (mm) | 85 | 85 | 85 | 85 | 85 |
| delayed mould opening (sec) | 1 | 5 | 1 | 1 | 12.5 |
| initial wall thickness (mm) | 10 | 10 | 10 | 10 | 10 |
| end thickness (mm) | — | — | 15.5 | 23 | — |
| weight (kg) | — | — | — | 9.29 | — |

Figure 3:
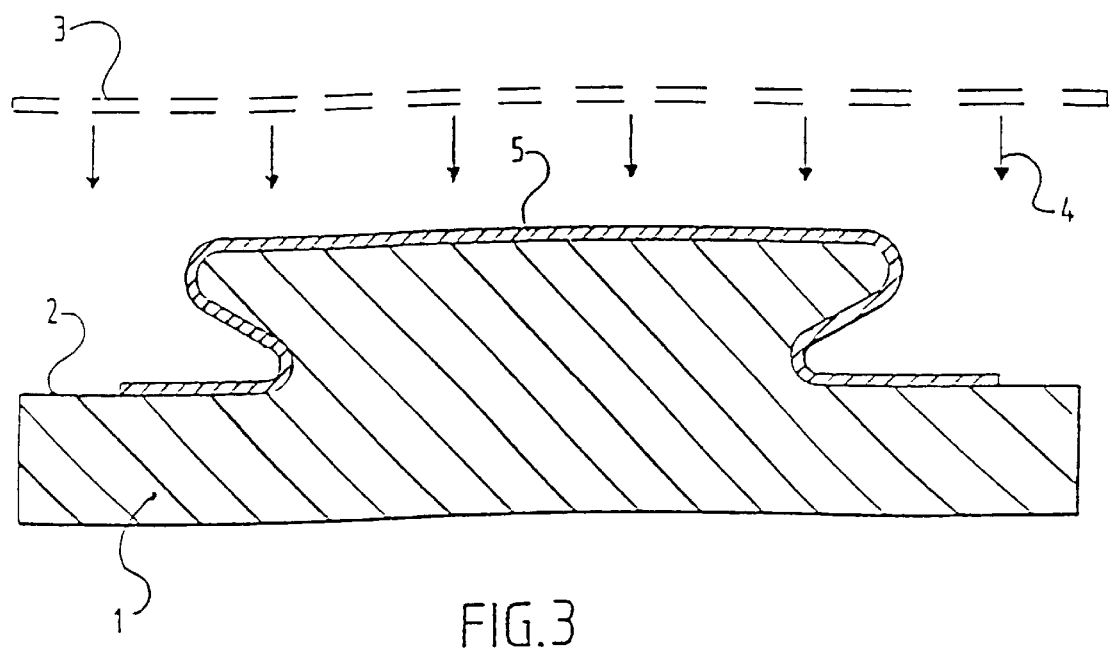
FIG. 3 shows in schematic cross-section a mould for forming a basic preform.

FIG. 3 shows schematically a cooled aluminium mould 1 with a moulding surface 2 for forming a basic preform from a foil 3. For this purpose the foil 3 is placed as according to arrows 4 over the moulding surface to be brought into the shown form by vacuum forming or other suitable technique. This basic preform is designated with reference numeral 5.

Attention is drawn to the fact that the foil is not drawn in proportion to its actual depth. This also applies for the other figures.

Figures 4, 5:
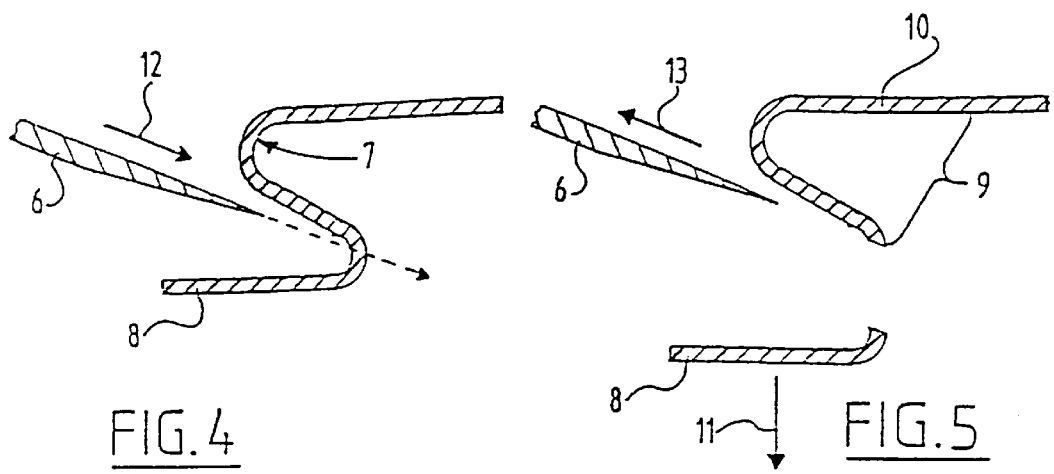
FIG. 4 shows a cross-section through the edge zone of the basic preform prior to the cutting operation.
FIG. 5 shows a view corresponding with FIG. 3 after the cutting operation.

After cooling of the mould 1, the preform can be removed from the undercut moulding surface 2 by exerting a comparatively small force. At an appropriate moment, either in the phase where the basic preform is still situated on the moulding surface 2 or in the phase where it is already removed therefrom, a severing operation can be performed on the edge zone of S-shaped cross section by means of a knife 6 as according to FIG. 4. As FIG. 3 shows, the cross section of the basic preform 5 is generally omega-shaped. In order to perform the method according to the invention the end edge zone 8 must be cut off such that the edge zone 9 of the obtained preform shown in FIG. 3 has the illustrated, desired undercut shape. The end edge zone is disposed of as according to arrow 11. The associated movements of the knife 6 are indicated in FIGS. 4 and 5 with respective arrows 12 and 13.

Figure 6:
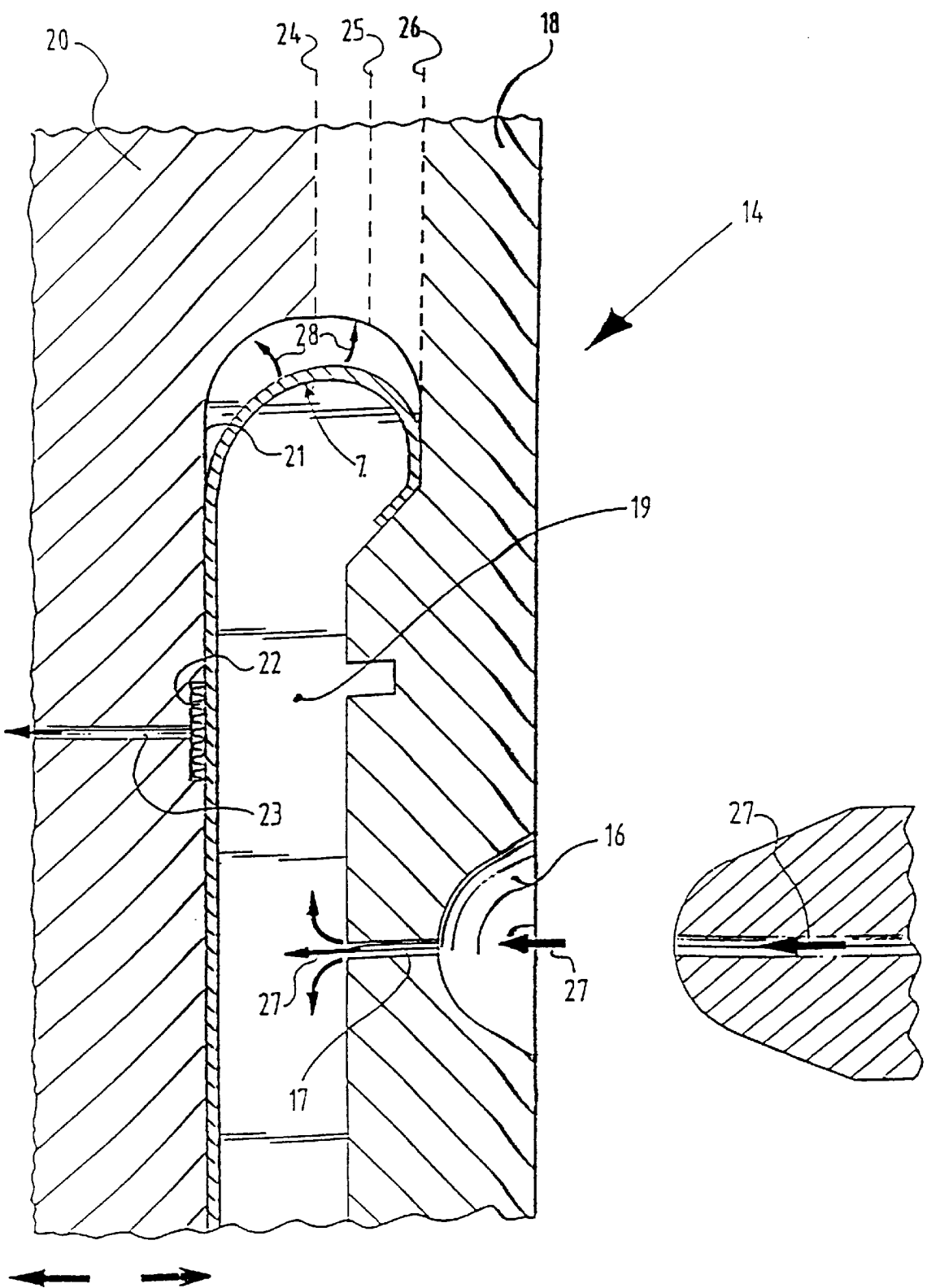
FIG. 6 shows a highly schematic cross-section through an injection moulding device.

FIG. 6 shows an injection moulding device 14. This comprises a plastic-plasticizing and injection device of which only the nozzle 15 is shown. This nozzle is connectable to the mould cavity 19 via a cavity 16 which in turn connects onto an injection channel 17 in mould half 18, the mould cavity 19 also being bounded by the other mould half 20. The preform 10 is placed against the surface 21 of the mould cavity 19 and held in position there by suction means consisting of a plurality of perforated or porous zones 22 which are connected via lines 23 to a suction head (not shown).

The separation between the mould halves 18 and 20 can take place as desired at different levels. Three possibilities are drawn. These are designated respectively 24, 25 and 26. The location 24 has the drawback that it can leave a visible mark in the end product. To a lesser extent this is also the case with the separation 25. The separation 26 will be invisible but has the drawback that the possible depth of the undercut is limited. It is further noted that the separation 26 can have the drawback that it is necessary to wait a relatively long time until the cooling shrinkage is sufficiently great to enable removal of the formed product out of the opened mould.

When plasticized plastic, in particular PP, is injected as according to arrows 27, the preform 10 will warm up and undergo softening. The edge zone 7 can thereby be pressed as according to arrows 28 against the peripheral wall of mould cavity 19 under influence of the pressure of the injected plastic.

Figure 7:
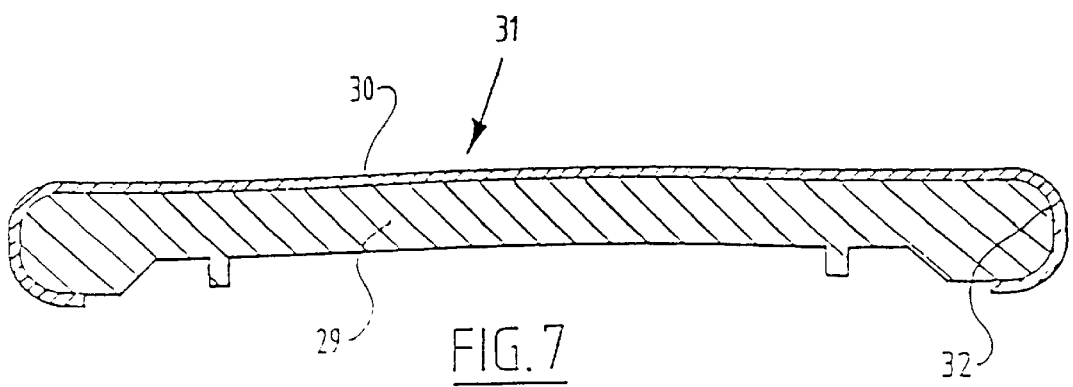
FIG. 7 shows a cross-section through a board according to the invention manufactured with the injection moulding device of FIG. 6.

Finally, FIG. 7 shows a finished board 31 comprising a PP basic board 29 on which a cover foil 30 is arranged such that it extends round the peripheral edge 32 thereof.

Attention is drawn to the fact that the adhesion between the injected plastic and the foil can be ensured in different ways. Use can for instance be made of foil with an adhesive layer present thereon, or a heat-activated glue.

What is claimed is:

1. A method for manufacturing a plastic board provided with a cover foil, which method comprises the following steps:
    (1) providing an injection moulding device with a plastic-plasticizing and injection device and a mould which comprises at least two mould parts displaceable relative to each other, which mould parts in a closed first extreme position bound a mould cavity which connects onto the plasticizing and injection unit and which has a shape adapted to the shape of the board for manufacturing, and which mould parts in an open second extreme position release a formed board for removal;
    (2) manufacturing a cover foil preform with an undercut peripheral edge shape which is adapted to the shape of the board for manufacturing such that the cover foil can extend round the peripheral edge of the board for manufacturing;
    (3) placing the preform against a wall of the opened mould cavity remote from a plastic feed opening connected to the plastic-plasticizing and injection device and holding said preform in position therein by means of holding means;
    (4) closing the mould cavity and energizing the plasticizing and injection unit to inject into the mould cavity plasticized plastic which can adhere with the preform;
    (5) ending the energizing of the plasticizing and injection unit;
    (6) expanding the mould cavity by moving the mould parts in the direction of the second extreme position without opening the mould cavity; and
    (7) causing the formed board with cover foil adhered thereto to cool to a chosen temperature, fully opening the mould cavity and removing the manufactured board.

2. The method as claimed in claim 1,
wherein the plasticized plastic is polypropylene.

3. The method as claimed in claim 2,
wherein the manufactured board has a thickness of at least 6 mm, which board comprises a sandwich-like structure with a foam core and closed skin plates.

4. The method as claimed in claim 1,
wherein the cover foil preform is manufactured as a generally omega-shaped basic preform in which an end zone thereof is removed in order to obtain the desired undercut form of the cover foil preform.

5. The method as claimed in claim 1,
wherein the plastic for the foil and the plastic for injecting are the same plastic or a compatible plastic.

6. The method as claimed in claim 1,
wherein the foil has an adhesive layer thereon which is directed toward the mould cavity.

7. The method as claimed in claim 1,
wherein the preform undergoes an expansion in an edge zone.

8. The method as claimed in claim 1,
wherein the holding means for holding the preform in position against a wall of the mould cavity is one of a suction means, an electrostatic means and a mechanical means.

9. The method as claimed in claim 1,
wherein the mould cavity is dimensioned, taking into account the cooling shrinkage of the injected plastic.

10. The method as claimed in claim 1,
wherein the method makes use of a mould surface forming part of a mould, taking into account the cooling shrinkage of the applied foil material.

* * * * *